US012559980B2

(12) United States Patent
King et al.

(10) Patent No.: US 12,559,980 B2
(45) Date of Patent: Feb. 24, 2026

(54) SMART LOCK

(71) Applicant: Glue AB, Stockholm (SE)

(72) Inventors: Edward King, London (GB); Andoni Villarreal, Coulsdon (GB)

(73) Assignee: Glue AB, Stockholm (SE)

(*) Notice: Subject to any disclaimer, the term of this patent is extended or adjusted under 35 U.S.C. 154(b) by 284 days.

(21) Appl. No.: 18/016,803

(22) PCT Filed: Jul. 19, 2021

(86) PCT No.: PCT/EP2021/070113
§ 371 (c)(1),
(2) Date: Jan. 18, 2023

(87) PCT Pub. No.: WO2022/018014
PCT Pub. Date: Jan. 27, 2022

(65) Prior Publication Data
US 2023/0287710 A1 Sep. 14, 2023

(30) Foreign Application Priority Data
Jul. 20, 2020 (GB) .................................... 2011117

(51) Int. Cl.
*E05B 47/02* (2006.01)
*E05B 47/00* (2006.01)

(52) U.S. Cl.
CPC ........ *E05B 47/026* (2013.01); *E05B 47/0012* (2013.01); *E05B 2047/0026* (2013.01);
(Continued)

(58) Field of Classification Search
CPC ............... E05B 47/026; E05B 47/0012; E05B 2047/0026; E05B 2047/0065;
(Continued)

(56) References Cited

U.S. PATENT DOCUMENTS

2012/0036904 A1* 2/2012 Chang ..................... E05B 47/02 70/91
2013/0192317 A1* 8/2013 McKibben ............. G08C 17/02 292/144
(Continued)

FOREIGN PATENT DOCUMENTS

GB 2552667 A * 2/2018 ............... E05B 1/00
GB 2568730 A * 5/2019 ......... E05B 47/0012
(Continued)

OTHER PUBLICATIONS

Oct. 19, 2021—(WO) International Search Report and Written Opinion—PCT/EP2021/070113.
(Continued)

*Primary Examiner* — Kristina R Fulton
(74) *Attorney, Agent, or Firm* — Banner & Witcoff, Ltd.

(57) ABSTRACT

A smart lock for securing a closure is provided. The smart lock comprises: a drive train for actuating a lock mechanism between an unlocked positon and a locked position; an actuator arranged to drive the drive train to actuate the lock mechanism; a position sensor arranged to output a location signal indicative of a position of the drive train; a manual actuator arranged to drive the drive train to actuate the lock mechanism; and a movement sensor arranged to output a movement signal in response to movement of the manual actuator. The movement sensor is arranged to draw less power than the position sensor. The smart lock further comprises a processor configured to: a. detect the movement signal; and b. monitor the location signal in response to the detection of the movement signal.

18 Claims, 5 Drawing Sheets

(52) U.S. Cl.
CPC ................. *E05B 2047/0065* (2013.01); *E05B 2047/0069* (2013.01); *E05B 2047/0084* (2013.01); *E05B 2047/0094* (2013.01)

(58) Field of Classification Search
CPC ..... E05B 2047/0069; E05B 2047/0084; E05B 2047/0094
USPC .......................................................... 70/283.1
See application file for complete search history.

(56) References Cited

U.S. PATENT DOCUMENTS

| | | | | |
|---|---|---|---|---|
| 2014/0165673 | A1* | 6/2014 | Tyner | E05B 17/22 70/141 |
| 2017/0211295 | A1 | 7/2017 | Lin et al. | |
| 2019/0003207 | A1* | 1/2019 | Wu | E05B 47/026 |
| 2019/0218824 | A1* | 7/2019 | Ainley | G01D 5/04 |
| 2019/0234110 | A1* | 8/2019 | Laporta | E05B 9/08 |

FOREIGN PATENT DOCUMENTS

| | | | | |
|---|---|---|---|---|
| JP | 2003-27783 | A | | 1/2003 |
| JP | 2003-74229 | A | | 3/2003 |
| JP | 2003074229 | A | * | 3/2003 |
| JP | 2003-286785 | A | | 10/2003 |
| JP | 2015-21282 | A | | 2/2015 |
| JP | 2016-69942 | A | | 5/2016 |
| JP | 2016069942 | A | * | 5/2016 |

OTHER PUBLICATIONS

Jan. 14, 2021—(GB) Combined Search and Examination Report—2011117.5.

* cited by examiner

SMART LOCK

CROSS-REFERENCE TO RELATED APPLICATIONS

This application is a U.S. National Stage application under 35 U.S.C. § 371 of International Application PCT/EP2021/070113, filed Jul. 19, 2021, which claims the benefit of priority to United Kingdom Patent Application GB 2011117.5, filed Jul. 20, 2020. Benefit of the filing date of each of these prior applications is hereby claimed. Each of these prior applications are hereby incorporated by reference in their entirety.

The present disclosure relates to an improved smart lock and associated methods that provide a means of unlocking and locking a door or other closure. In addition, the smart lock of the present disclosure allows a user to manage access through the door or closure for third parties, e.g. friends and family, delivery companies, cleaning companies, childcare providers and other visitors.

BACKGROUND

A “smart” lock is an electromechanical lock which is designed to perform locking and unlocking operations on a door when it receives instructions from an authorized remote device, such as a smart phone, typically using a wireless protocol and a cryptographic key to execute the authorization process. The smart lock may also monitor access, or access attempts, and send alerts as necessary to the remote device. Smart locks may be used as a part of a smart home.

Such smart locks may be applied to any type of closure or lock mechanism. An example of a Euro Cylinder smart lock is given in WO 2017/046399 A1, the entire contents of which is hereby incorporated by reference.

The smart lock can use a motor to drive a lock mechanism to secure and release a door. When the remote device is used to initiate a lock or unlock action this can be logged. It is likely that multiple people may have the ability to lock or unlock the smart lock from their individual remote devices, such as a family with multiple smartphones to lock and unlock the door to their family home. In this case, it is further useful if notifications are sent to one or more of the other remote devices when a lock or unlock is initiated. For example, parents may wish to receive a notification if a child locks or unlocks the door.

It is easy to log locking or unlocking events which are triggered by a remote device as this generates a digital event which can be readily logged and communicated. However, in most smart locks the lock mechanism can also be actuated between the locked and unlocked position by a manual user input. This may be via a physical key, which can be used for interior or exterior actuation. Alternatively, the interior actuation may be driven by a manual actuator such as a slide or thumb turn wheel. Such operations are not triggered by a digital event and hence are not logged, for example in an external or internal server or system, and thus are not notified to the homeowner.

Without these manual actuation events being logged or detected, the door may be opened and closed without a record or suitable notifications being generated.

There is therefore a need for an improved smart lock and associated method.

SUMMARY

The present disclosure provides a smart lock according to claim 1. This smart lock allows the position of the lock mechanism to be monitored when it is actuated by the manual actuator, while optimising the battery usage. The position sensor may be ignored by the processor unless movement of the manual actuator is detected. Alternatively, or additionally, the position sensor may be switchable between a low-power “sleep” mode and an active detection mode based upon the movement of the manual actuator being detected. That is, it is only necessary to constantly monitor the lower powered, sensor and the position sensor can be selectively monitored, thereby saving battery usage. The movement sensor draws this power when it is being used to sense the movement of the actuator, compared the power drawn by the position sensor when it is sensing the position of the drive train.

The movement sensor may be a passive sensor. That is, a sensor which does not draw power in order to detect the movement of the actuator.

The movement sensor is an electromagnetic sensor. Electromagnetic sensors are particularly suitable, particularly as they can be selectively activated.

The movement sensor may be a magnetic sensor comprising a magnetic detector and one or more magnets, wherein one of the magnetic detector or the one or more magnets may be installed on the manual actuator. A magnetic sensor is a convenient and simple way to detect movement of the manual actuator. In alternatives, any suitable sensor could be used such as a physical contact switch.

The one or more magnets of the passive magnetic sensor may be a plurality of magnets. A plurality of magnets can help ensure that movement of the manual actuator is detected as it allows a smaller movement be detected, for example because one of the magnets is likely to pass within the detection range of the magnetic detector.

The manual actuator may be rotatable about an axis to drive the drive train and the plurality of magnets may be rotationally symmetric about the axis. Many manual actuators are rotatable and having the magnets symmetric about the rotation axis is an effective way to detect any movement of the manual actuator.

The one or more magnets may be arranged on the manual actuator. It is simpler to arrange the magnets on the manual actuator as no addition wiring is necessary to the rotating component.

The manual actuator may be a thumb turn wheel. Users are used to actuating locks with such thumb turn wheels.

The processor may be configured to determine whether the lock mechanism is in the locked position or the unlocked position based upon the location signal to determine a locking status of the closure. The locking status represents the information regarding the movement of the lock mechanism into its most useful form.

The smart lock may further comprise a transmitter for communication with a remote device, the transmitter may be configured to transmit information relating to the location signal in response to the detection of the movement signal. The transmission may be via a central smart hub, or directly to the remote device. This allows the user of the remote device to monitor actions carried out on by the manual actuator.

The transmitter may be configured to transmit the locking status of the closure. This allows the user of the remote device to view the locking status of the door, which may be their primary concern. A notification may be generated on the remote device if the locking status of the door is changed.

The smart lock may further comprise a current sensor arranged to output a current signal indicative of an electrical current flowing through the electric actuator, wherein the processor may be further configured to determine a position of engagement between the drive train and the bolt based upon the current signal, wherein the determination of the locking status of the closure may be based upon a comparison of the location signal to the position of engagement between the drive train and the bolt. This is an effective way for the smart lock to determine whether the user turning the manual actuator has locked or unlocked the smart lock.

The processor may be further configured to: compare the movement signal to a threshold value; and carry out step b if the movement signal exceeds the threshold value. This allows the device to avoid monitoring someone merely fiddling with the manual actuator, without adjusting the locking status.

The position sensor may be an encoder. An encoder may include further processing steps which are used to interpret the raw data provided by the sensor itself.

A magnetic position sensor may be a particularly suitable position sensor for this arrangement.

The position sensor may be an active sensor. That is, the position sensor may require a power supply to operate. Such an active sensor is more precise than a passive sensor, and hence can more accurately detect the movement of the drive train and hence the lock mechanism.

The position sensor may be arranged in a low-power mode and the processor is configured to activate the position sensor in response to the detection of the movement and then carry out step b. The low-power mode may be a no-power or sleep mode. This may reduce the overall power usage of the system, thereby extending battery life.

According to a second aspect, a method of monitoring a smart lock is provided according to claim 17. This method allows the position of the lock mechanism to be monitored when it is actuated by the manual actuator, while optimising the battery usage. The position sensor may be ignored by the processor unless movement of the manual actuator is detected. Alternatively, or additionally, the position sensor may be switchable between a low-power "sleep" mode and an active detection mode based upon the movement of the manual actuator being detected. That is, it is only necessary to constantly monitor the passive, unpowered, sensor and the position sensor can be selectively monitored, thereby saving battery usage.

The movement sensor may be a passive sensor. That is, a sensor which does not draw power in order to detect the movement of the actuator.

The movement sensor is an electromagnetic sensor. Electromagnetic sensors are particularly suitable, particularly as they can be selectively activated.

The movement sensor may be a magnetic sensor comprising a magnetic detector and one or more magnets, wherein one of the magnetic detector or the one or more magnets may be installed on the manual actuator. A magnetic sensor is a convenient and simple way to detect movement of the manual actuator. In alternatives, any suitable sensor could be used such as a trigger switch.

The smart lock may further comprises a transmitter for communication with a remote device, the method may further comprise the step of: transmitting to the remote device information relating to the location signal in response to the detection of the movement signal. This allows the user of the remote device to monitor actions carried out on by the manual actuator.

The method may further comprise the step of: determining whether the lock mechanism is in the locked position or the unlocked position based upon the location signal to determine a locking status of the smart lock, and the information relating to the location signal may be the locking status of the smart lock. This allows the user of the remote device to view the locking status of the door, which may be their primary concern. A notification may be generated on the remote device if the locking status of the door is changed.

The smart lock may further comprise a current sensor arranged to output a current signal indicative of an electrical current flowing through the electric actuator, the method may further comprise the step of: determining a position of engagement between the drive train and the bolt based upon the current signal, wherein the determination of the locking status of the closure may be based upon a comparison of the location signal to the position of engagement between the drive train and the bolt. This is an effective way for the smart lock to determine whether the user turning the thumb turn has locked or unlocked the smart lock.

The method may further comprise the step of: generating on the remote device a notification if the locking status has changed. The generated notification can indicate to the user that the locking status of the door has changed. This may inform them of activity they want to investigate further.

The position sensor may be in a low-power mode and the method may further comprises the step of: activating the position sensor in response to the detection of the movement signal. The low-power mode may be a no-power or sleep mode. This may reduce the overall power usage of the system, thereby extending battery life.

The method may further comprise the step of: comparing the movement signal to a threshold value, wherein the monitoring of the location signal may take place if the movement signal exceeds the threshold value. This allows the device to avoid monitoring someone merely fiddling with the manual actuator, without adjusting the locking status.

BRIEF DESCRIPTION OF THE FIGURES

By way of example only, embodiments of the present disclosure will now be described with reference to, and as shown in, the following drawings, in which.

DETAILED DESCRIPTION OF THE FIGURES

Figure 1:
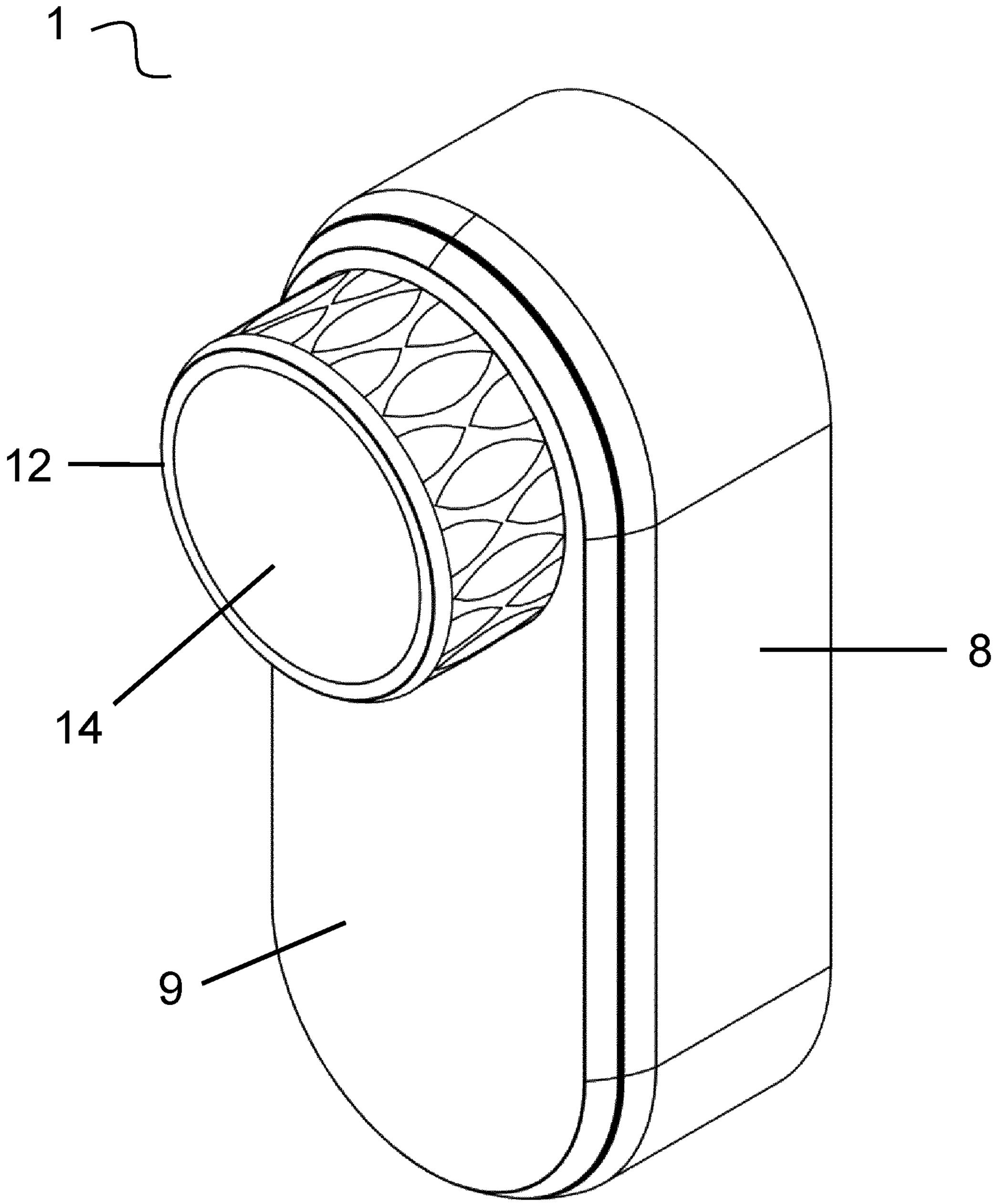
FIG. 1 s a perspective view of a smart lock according to the present disclosure.

FIGS. 1 to 4A illustrate a smart lock 1 according to the present disclosure. In the following, by way of example only, the smart lock 1 will be described and illustrated for use in securing a domestic swing door 5. That is, a door 5 which is mounted on one or more hinges and pivots on these hinges between an open position and a closed position. However, the smart lock 1 may be used to secure other doors and other types of closure if desired.

The smart lock 1 is generally as depicted and described in WO 2017/046399 A1, with modifications thereto discussed below. In particular, the actuation mechanism of the present invention, such as the clutch arrangement and/or drive train, may be as described in WO 2017/046399 A1 with modifications as discussed below.

The smart lock 1 may be formed of a main body component 8 and a front cover 9. Within this main body component 8, an electric actuator 24 may be provided. The electric actuator 24 may be a motor. A drive train may also be provided, arranged to actuate a lock mechanism between an unlocked position and a locked position. In the locked position, the door 5 is prevented from opening. In the unlocked position the door 5 is able to open. In use, the electric actuator 24 drives the drive train in order to actuate the lock mechanism between the unlocked position and the locked position.

Figure 4:
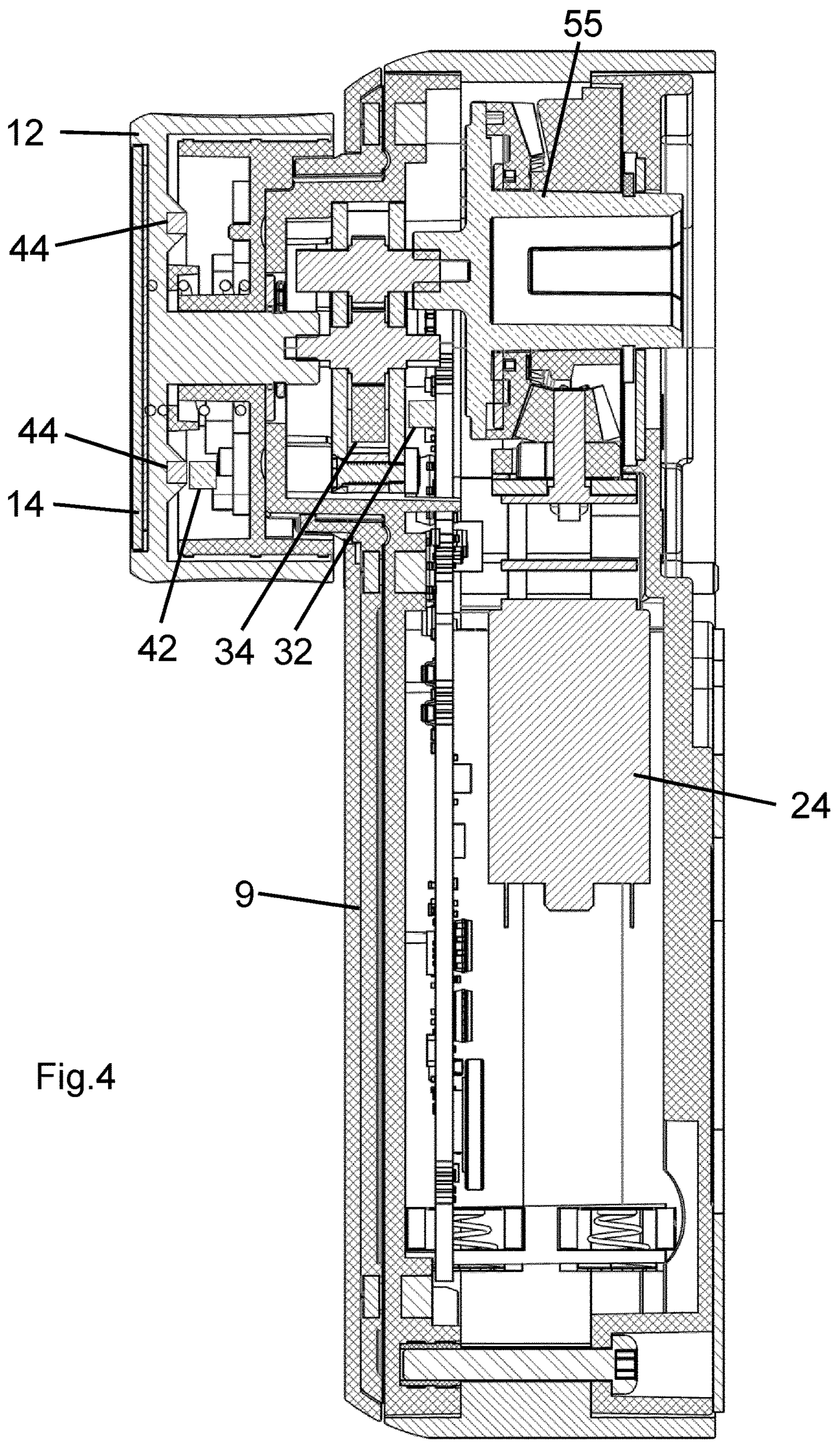
FIG. 4 is a sectional view of the smart lock of FIG. 1.

For example, an output shaft of the motor 24 may be coupled to a pinion gear 80 which is configured to couple to a bevel gear 57 in the drive train. As can be seen in FIG. 4, the axis of rotation of the output shaft of the motor 24 may be transverse or perpendicular to the rotational axis of the bevel gear 57.

Figure 2:
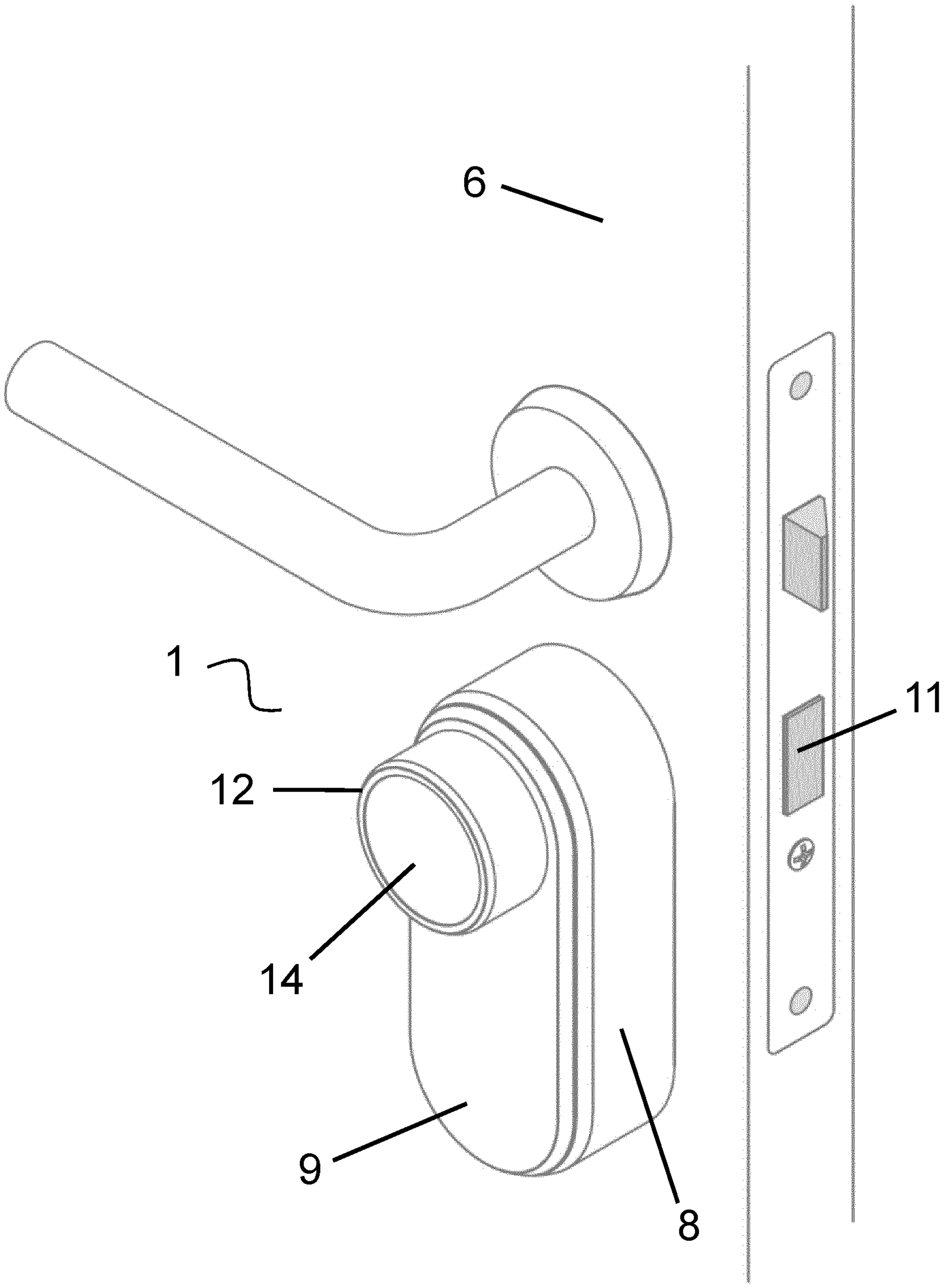
FIG. 2 is an illustration of the smart lock of FIG. 1 installed on a door.
Figure 3:
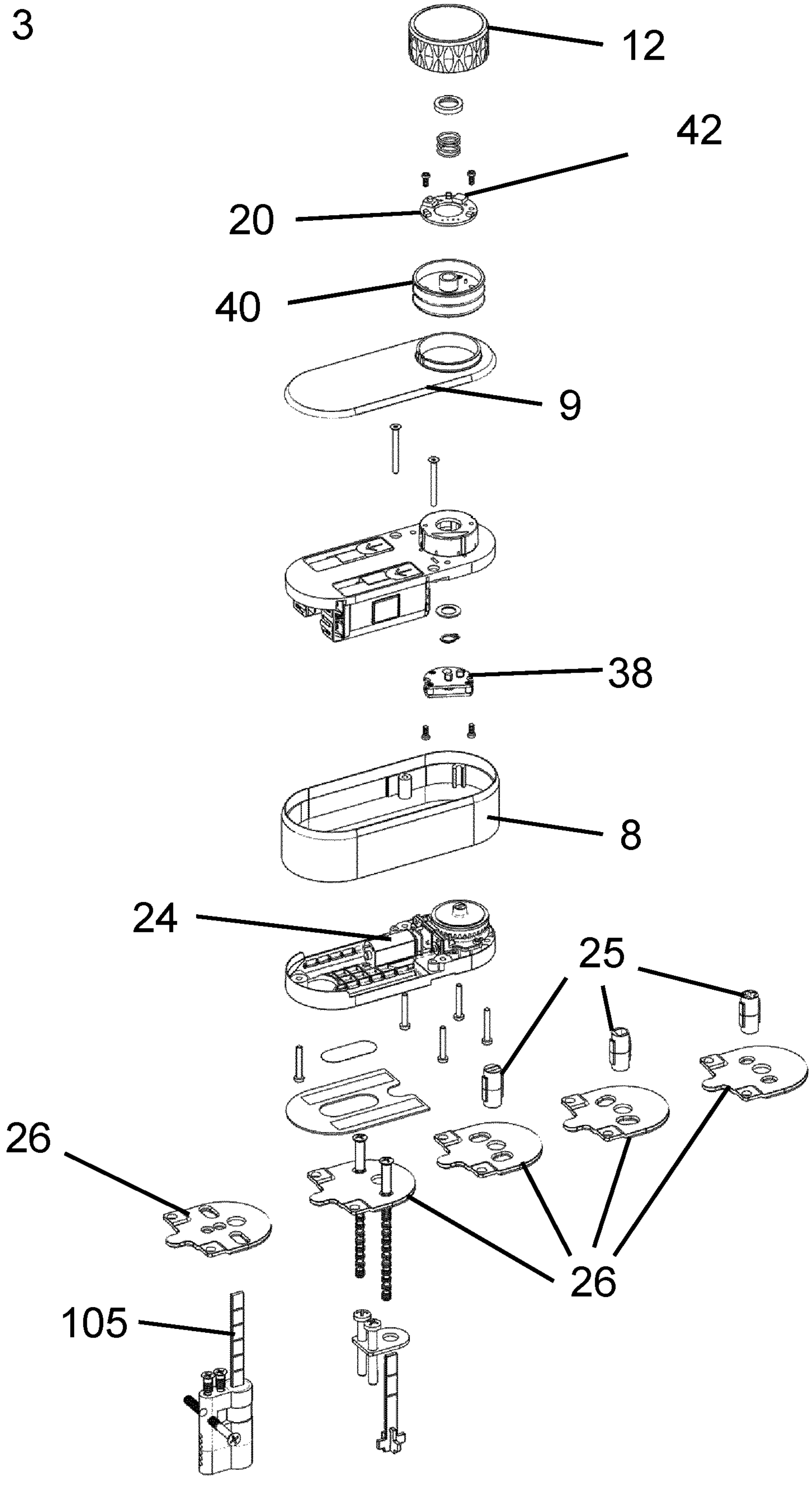
FIG. 3 is an exploded perspective view of the smart lock of FIG. 1.

The lock mechanism may comprise a bolt 11 which is shown in FIG. 2. The bolt 11 may be moveable between an unlocked position where it generally does not protrude from the door 6 (shown in FIG. 2) to a locked position where the bolt 11 protrudes from the door 6 to be received in a lock keep and prevent the door 6 from being opened. The position of the lock may be known as the "locking status". The movement of the bolt 11 from the unlocked position to the locked position is known as a "locking action". The movement of the bolt 11 from the locked position to the unlocked position is known as an "unlocking action".

The bolt 11, and/or lock mechanism as a whole, may be contained substantially within a recess in the door 6. This is particularly the case for a Euro Cylinder lock, or other mortice-type lock. Alternatively, the bolt 11, and/or lock mechanism as a whole, may be external to the door 6. For example, the bolt 11, and/or lock mechanism, may be retained within a separate housing, or within the smart lock housing 8. This is particularly the case for a rim lock such as shown in U.S. Pat. No. 4,313,320 A.

The smart lock 1 may comprise a receiver and/or a transmitter which is arranged for communication with a remote device, such as a smartphone. Alternatively, or additionally, the smart lock 1 may communicate with a remote hub, such as a smart hub, which itself is in communication with the remote device.

In use, the receiver may receive an input signal from the remote device which initiates a locking action or an unlocking action. The smart lock may further comprise a processor. The processor may be any suitable control system, and may include one or more sub-processors. The processor may receive the input signal and controls the actuation of the electric actuator 24 to drive the lock mechanism to complete the locking action or the unlocking action.

The smart lock 1 may further comprise one or more manual actuators. One manual actuator may be a key cylinder a keyhole for receiving a user's key to actuate the lock mechanism. The key cylinder may be a typical barrel cylinder which operates according to the known principles to rotate when the correct key is inserted into the keyhole and turned. A tail piece 105 extends from the key cylinder. The tail piece 105 turns when a key inserted into the key cylinder is turned. Movement of this tail piece 105 may actuate the lock mechanism to move the bolt 11 between the locked and unlocked positions.

Typically, the keyhole will be arranged on an outer side of the door 6. That is, the side of the door 6 which is generally exposed to the outer world. On the inner side of the door 6, it is not always necessary to require a key for locking and unlocking the smart lock 1. As an alternative, a thumb turn wheel 12 or other manual actuator which does not include any verification means for the operator. This allows the interior manual actuator to be quickly and easily operated to move the bolt 11 between the locked and unlocked positions.

In use, the actuation of the mechanical actuator also drives the drive train to actuate the lock mechanism. The drive train may include a clutch mechanism to isolate the mechanical and electric actuators. For example, the drive train may include a clutch body 55 which is arranged to receive the lock tailpiece 105. The lock tailpiece 105 may be received in an insert 25 which is selected to correspond to the particular type of lock being replaced. Likewise, an appropriate mounting plate 26 may be provided to mount the smart lock 1 to the door. The mounting plate 26 may correspond to the particular type of lock. This insert 25 may then be received within the clutch body 55 to allow for actuation of the lock mechanism.

The manual actuator may further include a button 14 for causing the electric actuator 24 to initiate a locking or unlocking action. Pressing of the button 14 may be detected by the processor, which then controls the electric actuator 24 as appropriate. For example, the button 14 may be provided as a button 14 on the thumb turn wheel 12 as shown in the present Figures. This button 14 may be used when a user is leaving via the door 6 (that is, going from an interior location to an exterior location).

When the bolt 11 is in the unlocked position, the user may push the button 14 to trigger a locking action. This locking action may take place after a predetermined delay period. For example, the locking action may take place after a given time period. Alternatively, the smart lock 1 may sense when the door 6 has been closed and the locking action may then be initiated.

As a result, the user can press the button 14 when they are leaving through the door 6. They can close the door 6 behind them and after the predetermined delay period the locking action is initiated to secure the door 6. The button 14 may be used to differentiate between an instant locking action, and a locking action after a predetermined delay period. For example, the button 14 may be pressed multiple times, or held in a pressed position, to trigger the predetermined delay period.

When the lock mechanism is actuated by the electric actuator 24, it is simple to log the actuation event, for example by the processor, as there is a digital event. The transmitter may then communicate with a user's remote device (potentially via the smart hub) to generate a notification of the event. When the locking or unlocking action is actuated via the manual actuator there is no such digital event.

In order to determine the position of the drive train, a position sensor may be provided. As the bolt is driven by the drive train, knowing the position of the drive train allows you to know the position of the bolt and hence its locking status. The position sensor may be arranged to output a location signal indicative of a position of the drive train, and hence of the lock mechanism and the bolt 11 and the electric actuator 24. For example, the position sensor may be arranged to detect the rotational position of one of the gears or clutch components in the drive train. The component which the position sensor is arranged on may be referred to as a sampling gear. In particular, the position sensor may be a rotary or linear encoder.

This sampling gear may be smaller than at least one other gear in the drive train. A smaller sampling gear may mean that movement of the lock mechanism will correspond to more rotations of the sampling gear. In some examples the position sensor may be arranged on a gear in the smallest half of gears in the drive train, or on the smallest gear of the drive train. A larger sampling gear may alternatively be used.

Preferably, the sampling gear (and any number of intermediary gears) is sized such that one full turn of the manual actuator results in an integer number, N, of turns of the sampling gear. That is, one full rotation of the sampling gear is a divisible ratio of the total rotation of the manual actuator.

In particular embodiments, the sampling gear may be arranged as a part of a gearbox 38. Preferably, the sampling gear also transmits torque through the gearbox and is not just there as a part of the position sensor. The sampling gear may have a gear ratio between 1:1 and 2:1 with the gear driving it.

The sampling gear may rotate many times before the bolt is moved between a locked and an unlocked position (or vice versa). In order to determine the position of the bolt, the accumulation of rotations may be counted (i.e. each 360° rotation), along with the angle of the current revolution. This allows the smart lock 1 to have an increased compatibility. Some locks may only have 90° of rotation, while others can have up to 720° and even beyond.

During installation the smart lock 1 may be calibrated by the user by rotating the thumb turn wheel 12 in to a series of orientations and are storing these in the internal memory of the smart lock 1. This then indicates to the smart lock 1 the type of door lock mechanism the smart lock 1 is interacting with and the processor can then control the electric actuator 24 to actuate the lock mechanism appropriately. This enables the smart lock 1 to be optimised across a wide range of compatible locks.

This calibration may include the start and stop position of rotation of the thumb turn wheel 12, the angular distance (for example in degrees) and duration (for example in seconds) of rotation, any positions that pauses in rotation are required and any “neutral position” that the lock should return to after the command has been carried out. This enables the smart lock 1 to be compatible with a wider range of door lock mechanisms.

The calibration may be carried out in conjunction with the external app.

In one example of calibration, the thumb turn wheel 12 is first turned to the fully locked position and then to the fully unlocked position (or vice versa). In these positions, the lock mechanism is contacting the respective mechanical end stop. The smart lock 1 may use the position sensor to identify when the bolt 11 is in the locked or unlocked positions on this basis. The processor may then control the motor 24 to turn the to the appropriate location to carry out the locking or unlocking event.

The position sensor may be a magnetic position sensor, formed of one or more magnets 34 and a magnetic sensor 32 arranged to detect the one or more magnets 34. In a particular embodiment, the magnetic position sensor may include a single diametric magnet 34, with a series of magnetic poles. The magnetic sensor may be a magneto-resistive or Hall Effect sensor.

The position sensor may be an active sensor, that is one that requires a power input to operate. This may be necessary to obtain sufficient accuracy from the measurement to determine the locking status of the lock mechanism. Once the location signal indicates that the lock has changed locking status, a signal may be transmitted to generate a notification on the user’s remote device.

In most operational set-ups, the smart lock 1 will not be connected to a mains power source and instead will have to rely upon battery power. Using the position sensor alone, the position sensor would have to be constantly powered in order to detect when a user has adjusted the locking status using the thumb turn 12. This would result on a constant drain on the battery, meaning that the battery must be recharged or replaced more frequently.

As such, the position sensor may be switched between an active detecting state and an inactive state. The position sensor may be entirely unpowered in the inactive state, or it may be in a low-power “sleep” state. In the inactive state, the position sensor is not able to output the location signal as it is not detecting movement of the drive train.

The smart lock 1 may further include a movement sensor arranged to output a movement signal in response to movement of the manual actuator. That is, the movement sensor outputs a signal to indicate that the manual actuator has been moved. The movement sensor may draw a lower power than the position sensor. For example, the movement sensor may be a passive or unpowered sensor. Alternatively, the movement sensor may be a low-power sensor such as an infrared sensor.

The movement sensor may be one or more switches, or micro switches. Alternatively, the movement sensor may be an optical sensor such as a photo-sensor reading light passing through or a hole or a rotating barcode. Preferably, the movement sensor is a magnetic sensor. For example, the movement sensor may be an AS5600 magnetic rotary position sensor. This magnetic sensor may comprise one or more magnets and a magnetic detector arranged to detect movement of the one or more magnets. Either the magnetic detector, or the one or more magnets, may be arranged on the manual actuator, with the other mounted on a stationary part of the smart lock 1.

Figure 4A:
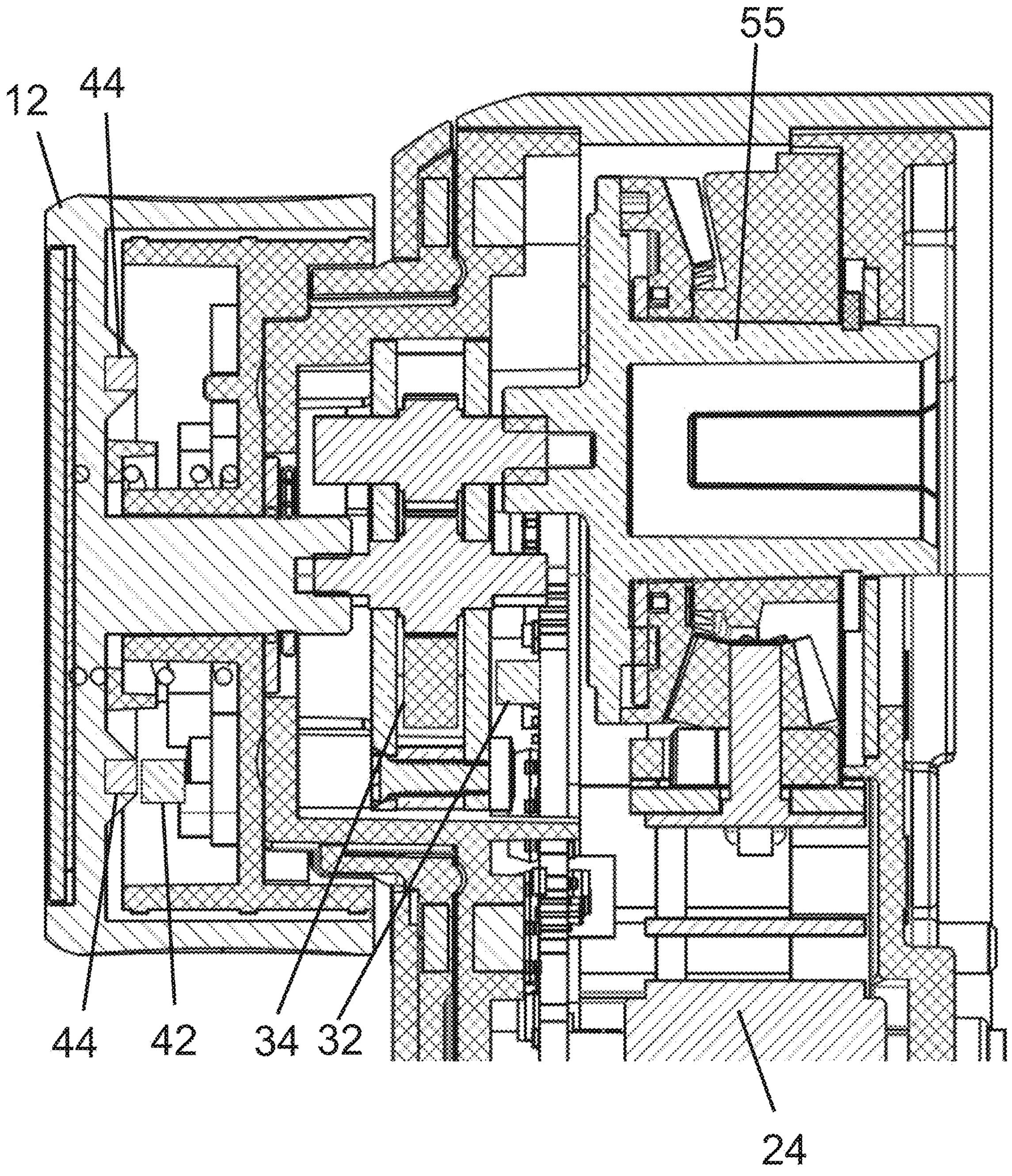
FIG. 4A is a close-up view of a portion of the sectional view of FIG. 4.

For example, the thumb turn 12 may rotate about a thumb turn inner wheel 40. The thumb turn inner wheel 40 may have a PCB 20 attached thereto, which may include the processor. The magnetic detector 42 may be mounted on the thumb turn inner wheel 40, with the one or more magnets 44 mounted to the thumb turn when 12. The one or more magnets 44 may be arranged on a side portion of the thumb turn wheel 12, as shown in FIGS. 4 and 4*a*. Alternatively, the magnets 44 may be arranged on any suitable surface. The thumb turn wheel rotates around an axis to actuate the lock mechanism, and the magnets 44 may be arranged with rotational symmetry about this axis.

As the manual actuator, in this case the thumb turn wheel 12, is moved the movement sensor outputs a movement signal which indicates that the thumb turn wheel 12 is being moved. In response to this movement signal, the processor may begin monitoring the position sensor. This may trigger the position sensor to “wake” the position sensor from the inactive state to the active state.

The position sensor can then be monitored to determine whether the movement of the manual actuator changes the locking status of the smart lock 1. This may be based upon the locked and unlocked positions for the position sensor learnt during the calibration step. Alternatively, the locking status of the smart lock 1 maybe determined by comparing the position of the lock mechanism to one or more operational end stops (described in detail below). The operational end stops may be spaced from the mechanical end stops.

If the locking status of the smart lock 1 is changed, the smart lock 1 may communicate with the remote device to generate a notification of the lock status being changed. In this sense, the lock status can be monitored even for manual actuation without unnecessarily draining the battery of the smart lock 1.

The movement signal of the manual actuator may be compared to a threshold value in order to differentiate between someone fiddling with the manual actuator, and a locking or unlocking event. For example, the threshold may require a certain amount of movement of the manual actuator, or may require the manual actuator to be moved for a given period of time.

A smart lock 1 for securing a closure is provided. The smart lock 1 may comprise: a drive train for actuating the lock mechanism between an unlocked positon and a locked position. The smart lock 1 may further comprise an electric actuator 24 arranged to drive the drive train to actuate the lock mechanism, and a position sensor arranged to output a location signal indicative of a position of the drive train. The smart lock 1 may further comprise a manual actuator arranged to drive the drive train to actuate the lock mechanism, and a movement sensor arranged to output a movement signal in response to movement of the manual actuator. The processor may be configured to: detect the movement signal; and monitor the location signal in response to the detection of the movement signal.

The smart lock 1 may comprise a current sensor arranged to output a current signal indicative of the electrical current flowing through the electric actuator 24. For example, the current sensor may be an ammeter installed in series with the electric actuator 24. The current sensor may be connected to the processor to transmit the current signal to the processor.

A current may be required in order to drive the electric actuator 24. The current drawn will depend upon the load placed upon the electric actuator 24. This can be used to define one or more operational end points for the smart lock 1.

The lock mechanism is able to travel between a first mechanical end stop and a second mechanical end stop. Each mechanical end stop represents the physical limit of how far the lock mechanism will move in the locking and unlocking directions. The first mechanical end stop may correspond to a locked mechanical end stop, and the second mechanical end stop may correspond to an unlocked mechanical end stop, or vice-versa.

When the electric actuator 24 is used to drive the lock mechanism an essentially regular current profile will be drawn. The current may vary during the entire movement due to the spring forces or friction in the system during its movement, but the general profile is reproduced. Once the lock mechanism reaches the mechanical end stop, the resistance to further movement will result in the electric actuator 24 stalling and the current drawn to rapidly increase. The action of stalling the motor for a period of time at the mechanical end stop may result in a current consumption spike of 300% to 400% the normal load experienced by the system. In this sense, the mechanical end stop can be identified by detecting this stall current.

In particular, the processor may control the electric actuator 24 to actuate the lock mechanism in a first direction. The first direction may be either of a locking or unlocking direction. The first direction may be clockwise or counterclockwise for a rotational lock mechanism. Once the current begins to increase, the location signal from the position sensor may be read to determine the position of the first mechanical end stop. The current increase may be identified by comparing the current to a threshold value, by comparing the rate of change of the current to a threshold rate of change, by comparing the length of time of increasing current to a threshold length of time, or any other suitable method.

With the first mechanical end stop position determined, the processor may then define a first operational end stop. This first operational end stop may be defined with respect to the location signal provided by the position sensor. The first operational end stop is spaced from the first mechanical end stop. For example, the first operational end stop may be defined as a particular distance from the first mechanical end stop based upon the location signal from the position sensor. Alternatively, the first operational end stop may be defined based upon a time offset from the time taken for the lock mechanism to reach the first mechanical end stop. Alternatively, the first operational end stop may be defined based upon a distance offset or a time offset from a pick-up location for the bolt (described in detail below). The position sensor may rotate through multiple complete rotations.

The processor may be configured to: a. control the electric actuator to actuate the lock mechanism in a first direction; b. monitor the current signal; c. determine a position of the first mechanical end stop for the lock mechanism based upon the current signal; d. define a first operational end stop for the lock mechanism, the first operational end stop spaced from the first mechanical end stop; and e. control the electric actuator to actuate the lock mechanism to stop at the first operational end stop based upon the location signal. These steps may be carried out in the order a, b, c, d, e. Alternatively, the steps may be carried out in any other suitable order.

The processor may then control the electric actuator 24 to actuate the lock mechanism in a second direction, opposite to the first direction. That is, if the first direction is the locking direction the second direction is the unlocking direction, and vice-versa. This essentially allows the processor to map the entire travel pathway of the locking mechanism.

The lock mechanism may then be driven in this second direction until it reaches the second mechanical stop. Again, this will result in the current drawn by the electric actuator 24 to increase which may be identified as noted above. The position of the second mechanical stop position may therefore be determined.

The processor may further be configured to: f. control the electric actuator to actuate the lock mechanism in a second direction, opposite to the first direction; g. monitor the current signal; h. determine a position of the second mechanical end stop for the lock mechanism based upon the current signal; i. define a second operational end stop for the lock mechanism, the lock mechanism spaced from the second mechanical end stop at the second operational end stop and; j. control the electric actuator to actuate the lock mechanism to stop at the second operational end stop based upon the location signal. These steps may be carried out in the order a, b, c, d, e, f, g, h, i, j. Alternatively, the steps may be carried out in the order a, b, c, f, g, h, followed by steps d, e, i and j in any suitable order. Further alternatively, the steps may be carried out in any other suitable order.

This second operational end stop may be defined with respect to the location signal provided by the position sensor. The second operational end stop is spaced from the second mechanical end stop. For example, the second operational end stop may be defined as a particular distance from the second mechanical end stop based upon the location signal from the position sensor. Alternatively, the second operational end stop may be defined based upon a time offset from the time taken for the lock mechanism to reach the second mechanical end stop. Alternatively, the second operational end stop may be defined based upon a distance offset or a time offset from a pick-up location for the bolt (described in detail below). The position sensor may rotate through multiple complete rotations.

These calibration steps may be carried out a number of times in a sequence, with the operational end stop(s) determined based upon averaged values.

The travel pathway of the locking mechanism can then be defined as the total distance traversed by the locking mechanism between the first and second mechanical end stops. This may be defined as a number of complete and incomplete rotations of the position sensor. As a result, the total possible movement of the lock mechanism may be mapped. A total travel time may also be defined as the time required for the electric actuator 24 to drive the lock mechanism from the first mechanical end stop to the second mechanical end stop, or vice-versa.

The spacing of each operational end stop from its respective mechanical end stop may be defined as a percentage of the overall travel pathway, or the overall travel time. For example, each operational end stop may be spaced at least 1% of the travel pathway from its respective mechanical end stop, preferably at least 5%, most preferably at least 10%.

In further usage, the processor may control the electric actuator 24 to drive the lock mechanism until it stops at the operational end stop, before the mechanical end stop. In this sense, the electric actuator is prevented from stalling, reducing the wear on the components and hence increasing the life of the smart lock 1.

The processor may store the position of each mechanical end stop and/or each operational end stop. For example, the processor may store the position of the first mechanical stop on a memory unit. The memory unit may be a volatile memory unit. That is, a memory unit which only stores information when it is powered. As a result, the smart lock 1 will need to re-determine each mechanical stop and operational stop when the battery is removed. Alternatively, the memory unit may be a non-volatile memory unit.

The manual calibration described above may be automatically carried out by the processor using the current sensor and the position sensor. The processor may first control the electric actuator 24 to drive the lock mechanism to the first mechanical end stop, then define an appropriate first operational end stop. The processor may then control the electric actuator 24 to drive the lock mechanism to the second mechanical end stop, then define an appropriate second operational end stop. Of course, the processor may control the electric actuator 24 to first drive the lock mechanism to the first mechanical end stop then the second mechanical end stop, before calculating each operational end stop.

Typically, the drive train will move with relative ease (and hence a lower current) until the bolt 11 is picked up and moved. This is also known as an engagement point or position. That is, the lock mechanism will have a degree of movement in either direction where it is not also throwing the bolt 11 between the locked and unlocked positions. When the lock mechanism picks up the bolt (and hence the drive train picks up the bolt) there will be an associated current spike. This spike will typically be smaller than the motor stall spike. The smaller spike represents a pick-up location for the bolt 11.

The smart lock 1 may have at least two pick-up locations, a locked pick-up location which is when the bolt is picked up during a locking event, and an unlocked pick-up location when the bolt is picked up during an unlocking event.

Each pick-up location may be identified and located in a similar manner as described above. The processor will be monitoring the current signal for a different set of characteristics than for the mechanical end stop. Once these pick-up current characteristics are detected, the position of the pick-up point can be determined from the location signal.

The first and/or second operational end points may be defined with respect to these pick-up points. For example, the locked operational end point may be defined a certain distance or time from the locked pick-up point. This can help minimise the travel distance of the lock mechanism and hence the operation time of the motor.

Alternatively, third and/or fourth operational end points may be defined with reference to the pick-up points. As a result there may be multiple locked and/or unlocked operational end points. The processor may select which operational end point based upon certain factors.

For example, one of the locked operational end points may be more secure than another of the locked operational end points. For example, the lock bolt 11 may have two locked positions, for example with different throw lengths. The processor may select which operational end point is appropriate for a given use situation.

The processor may use one or more of a time signal, a user input, learned user behaviour; and/or sensed user behaviour to select the appropriate operational end point, or a combination thereof. For example, if the time signal indicates that the current time is when the user is likely to be away from the door 6 (such as at work) or sleeping (such as in the evenings) it may select the more secure locked operational end point and control the motor to actuate the lock mechanism to this operational end point.

The smart lock 1 may apply machine learning to detect and learn the user's typical behaviour and use this to predict the next operation and select appropriate operational end points on this basis. For example, if the user typically leaves their house on a Sunday evening for a few minutes (such as to put out the rubbish) the processor may control the motor to actuate the lock mechanism to the operational end point corresponding to just before the locked pick-up point as it predicts that the user will want to unlock the door 6 shortly to re-enter.

The measurements to define each operational end stop may be carried out a single time. Alternatively, they may be repeated multiple times (such as during normal operation of the lock) and averages taken. This may help to remove erroneous data from an individual measurement.

Any of the operational end stops may be used to determine whether a user has locked or unlocked the smart lock 1 using the manual actuator. As described above, the position sensor may be activated when a user begins moving the manual actuator, such as turning the thumb turn wheel 12. The position sensor may detect when the manual actuator has moved the lock mechanism to or past an operational end stop. The movement of the lock mechanism to or past the operational end stop may be used to determine that the lock status has changed.

This may be particularly useful with an operational end point defined by a pick-up location of the bolt 11. Such locations are shortly after the bolt 11 has been moved to the locked or unlocked position and hence represent suitable trigger points to determine that the locking status has changed.

For example, if the processor detects that the manual actuator has moved the locking mechanism past the locked pick-up point, then past the un-locked pick-up point it indicates that the bolt 11 has been moved from the locked to the unlocked position.

If, following manual operation the lock mechanism has been left at a position not corresponding to any operational end points, the processor may control the motor to actuate the lock mechanism to an appropriate end point. For example, if the lock mechanism is left in a locked position the processor may control the motor to actuate the lock mechanism to a locked operational end point. This may be any locked operational end point as discussed above, and may be selected based upon one or more of: a time signal, a user input, learned user behaviour, and/or sensed user behaviour in the same manner as described above.

Additionally, or alternatively, the processor may control the motor to actuate the lock mechanism to a position that is more advantageous for the next anticipated operation. For example, this may be used to shorten the amount of travel before the drive train engages the bolt. Thus, there will be less actuation required when next unlocking the smart lock. This can therefore speed up the opening of the smart lock 1 when it is being actively used. Some of the process in carried out in advance, when time is not of the essence after the last operation.

The processor may predict the next anticipated operation based upon learnt behaviours of the users, for example that certain actions, potentially at certain times, are followed by certain other actions.

A smart lock 1 for securing a closure may be provided. The smart lock may comprise: a drive train for actuating a lock mechanism between a first mechanical end stop and a second mechanical end stop, corresponding to an unlocked position and a locked position or vice-versa. The smart lock 1 may further comprises an electric actuator 24 arranged to drive the drive train to actuate the lock mechanism, and a position sensor arranged to output a location signal indicative of a position of the drive train. The smart lock 1 may further comprise a current sensor arranged to output a current signal indicative of an electrical current flowing through the electric actuator 24. The smart lock 1 may further comprise a processor configured to: control the electric actuator to actuate the lock mechanism in a first direction; monitor the current signal; determine a position of the first mechanical end stop for the lock mechanism based upon the current signal; define a first operational end stop for the lock mechanism, the first operational end stop spaced from the first mechanical end stop; and control the electric actuator to actuate the lock mechanism to stop at the first operational end stop based upon the location signal.

Any of the above-described smart locks 1 may be installed on any suitable door 6, either as a retrofit or a brand new installation. The smart lock 1 may be used in a number of methods.

A method of monitoring a smart lock 1 is also provided. The smart lock 1 may comprise: a drive train for actuating a lock mechanism between an unlocked positon and a locked position; an electric actuator arranged to drive the drive train to actuate the lock mechanism; a position sensor arranged to output a location signal indicative of a position of the drive train; a manual actuator arranged to drive the drive train to actuate the lock mechanism; and a movement sensor arranged to output a movement signal in response to movement of the manual actuator. This smart lock 1 may be generally as described above.

The method may first comprise the step of detecting the movement signal to identify movement of the manual actuator. For example, the movement signal may be compared to an value-based, or time-based threshold.

The location signal may then be monitored in response to the detection of the movement signal to determine a position of the drive train. This may involve activating the position sensor. That is the position sensor may be in a low-power or no power "sleep" mode, and the processor may "wake" the position sensor from this sleep mode, for example by providing a full powering voltage and current to the position sensor.

The smart lock may further comprise a transmitter and/or a receiver for communication with a remote device. The remote device may be a smartphone, or other device that a user is likely to keep on their person. The smart lock may communicate directly with the remote device. Alternatively, or additionally, the smart lock may communicate with the remote device via a central smart hub, which then communicates with the remote device. The central smart hub may be a server or cloud-based system located internally or external to the house that the smart lock 1 is protecting.

The method may then further comprising the step of transmitting to the remote device information relating to the location signal in response to the detection of the movement signal.

The smart lock 1 (or associated linked device, such as the central hub) may determine whether the lock mechanism is in the unlocked position or the locked position based upon the location signal to determine a locking status of the smart lock 1. The locking status is an indication of whether the bolt 11 is in the locked or unlocked position. This locking status may be the information relating to the location signal transmitted to the remote device. This information may only be transmitted if the locking status has changed. The remote device may generate a notification if the locking status has changed. Alternatively, or additionally, the remote device may send a query to the smart lock 1 when the user of the smart device requests to check its status, for example via an application on the remote device.

A further method may be for calibrating a smart lock 1. A smart lock 1 for such a method may comprise: an electric actuator for actuating a lock mechanism between a first mechanical end stop and a second mechanical end stop, respectively corresponding to an unlocked position and a locked position or vice-versa; a position sensor arranged to output a location signal indicative of a position of the drive train; a current sensor arranged to output a current signal indicative of an electrical current flowing through the electric actuator; and a processor configured to control actuation of the electric actuator, The calibrating method may include a step of actuating the electric actuator 24 to actuate the lock mechanism in a first direction to locate the first mechanical end stop based upon the current signal. The electric actuator 24 may be controlled to actuate in this first direction by a processor. The first direction may be an unlocking or a locking direction, such as clockwise or anti clockwise.

A first operational end stop for the lock mechanism may then be defined based upon the location signal. The lock mechanism may be spaced from the first mechanical end stop at the first operational end stop. This spacing may be defined based upon a physical distance, or based upon a time of actuation. The first operational end stop may be defined by the processor.

In future operations, the processor may control the electric actuator 24 to stop moving the lock mechanism in the first direction once it reaches this first operational end stop.

The smart lock 1 may then also be calibrated in a second direction, opposite to the first direction. For example, if the first direction is a locking direction, the second direction is an unlocking direction, or vice versa. In some examples, the first direction may be clockwise and the second direction may be anticlockwise, or vice versa. The smart lock 1 may be actuated to actuate the lock mechanism in the second direction, opposite to the first direction. This actuation is to locate the second mechanical end stop based upon the current signal. A second operational end stop for the lock mechanism may then be defined based upon the location signal. The lock mechanism may be spaced from the second mechanical end stop at the second operational end stop in a similar manner as the first operational end stop.

A further method of re-calibrating a smart lock 1 is also provided. This method may be applied to a smart lock 1 which is in operation, which may have already been calibrated, such as via the method above.

The method of re-calibrating may take place with a smart lock 1 comprising: an electric actuator 24 for actuating a lock mechanism between a first mechanical end stop and a second mechanical end stop, corresponding to an unlocked position and a locked position or vice-versa. A position sensor may be arranged to output a location signal indicative of a position of the drive train. A current sensor may be arranged to output a current signal indicative of an electrical current flowing through the electric actuator 24. The smart lock 1 may further comprise a processor configured to control actuation of the electric actuator. The processor may define a first operational end stop for the lock mechanism based upon the location signal, the lock mechanism spaced from the first mechanical end stop at the first operational end stop. The processor may store this first operational end stop in a memory unit, such as a volatile memory. Alternatively, the end stop may be stored on a non-volatile memory.

The electric actuator may be actuated to actuate the lock mechanism in the first direction to locate the first mechanical end stop based upon the current signal. Once the first mechanical end stop has been located, the first operational end stop may be re-defined based upon the location signal. The lock mechanism may be still spaced from the first mechanical end stop at the re-defined first operational end stop.

In this sense the smart lock 1 may continue to be accurate and efficient over time. For example this may be useful as the charge on the battery is drained which may alter its performance. The re-calibration may be carried out for as many operational end stops as are defined for the smart lock 1. The re-calibration may be configured to be automatically carried out after a certain time period, or after a certain number of operations of the smart lock 1. The re-calibration may also be carried out following a user input.

The invention claimed is:

1. A smart lock for securing a closure, the smart lock comprising:

a drive train for actuating a lock mechanism between an unlocked position and a locked position;

an electric actuator arranged to drive the drive train to actuate the lock mechanism;

a position sensor arranged to output a location signal indicative of a position of the drive train;

a manual actuator arranged to drive the drive train to actuate the lock mechanism;

a movement sensor arranged to output a movement signal in response to movement of the manual actuator, the movement sensor arranged to draw less power than the position sensor;

a processor configured to:

a. detect the movement signal;

b. compare the movement signal to a threshold value; and when the movement signal exceeds the threshold value, monitor the location signal.

2. The smart lock of claim 1, wherein the movement sensor is a passive sensor.

3. The smart lock of claim 1, wherein the movement sensor is a magnetic sensor comprising a magnetic detector and one or more magnets, wherein one of the magnetic detector or the one or more magnets is installed on the manual actuator.

4. The smart lock of claim 3, wherein the one or more magnets are arranged on the manual actuator.

5. The smart lock of claim 1, wherein the manual actuator is:

a thumb turn wheel; or a key.

6. The smart lock of claim 1, wherein the processor is configured to determine whether the lock mechanism is in the unlocked position or the locked position based upon the location signal to determine a locking status of the closure.

7. The smart lock of claim 6, further comprising a current sensor arranged to output a current signal indicative of an electrical current flowing through the electric actuator, wherein the processor is further configured to determine a position of engagement between the drive train and the bolt based upon the current signal, wherein the determination of the locking status of the closure is based upon a comparison of the location signal to the position of engagement between the drive train and the bolt.

8. The smart lock of claim 1, further comprising a transmitter for communication with a remote device, the transmitter configured to transmit information relating to the location signal in response to the detection of the movement signal.

9. The smart lock of claim 1, wherein the position sensor is an active sensor.

10. The smart lock of claim 1, wherein the position sensor is arranged in a low-power mode and the processor is configured to activate the position sensor in response to the detection of the movement and then carry out step b.

11. A method of monitoring a smart lock comprising:

a drive train for actuating a lock mechanism between an unlocked position and a locked position;

an electric actuator arranged to drive the drive train to actuate the lock mechanism;

a position sensor arranged to output a location signal indicative of a position of the drive train;

a manual actuator arranged to drive the drive train to actuate the lock mechanism; and a movement sensor arranged to output a movement signal in response to movement of the manual actuator the movement sensor arranged to draw less power than the position sensor, the method comprising the steps of:

detecting the movement signal to identify movement of the manual actuator;

comparing the movement signal to a threshold value;

and when the movement signal exceeds the threshold value, monitoring the location to determine a position of the drive train.

12. The method of claim 11, wherein the movement sensor is a passive sensor.

13. The method of claim 11, wherein the movement sensor is a magnetic sensor comprising a magnetic detector and one or more magnets, wherein one of the magnetic detector or the one or more magnets is installed on the manual actuator.

14. The method of claim 11, wherein the smart lock further comprises a transmitter for communication with a remote device, the method further comprising the steps of:

transmitting to the remote device information relating to the location signal in response to the detection of the movement signal.

15. The method of claim 14, further comprising the step of:

determining whether the lock mechanism is in the unlocked position or the locked position based upon the location signal to determine a locking status of the smart lock, and the information relating to the location signal is the locking status of the smart lock.

16. The method of claim 15, wherein the smart lock further comprises a current sensor arranged to output a current signal indicative of an electrical current flowing through the electric actuator, the method further comprising the step of:

determining a position of engagement between the drive train and the bolt based upon the current signal, wherein the determination of the locking status of the closure is based upon a comparison of the location signal to the position of engagement between the drive train and the bolt.

17. The method of claim 15, further comprising the step of:

generating on the remote device a notification if the locking status has changed.

18. The method of claim 11, wherein the position sensor is in a low-power mode and the method further comprises the step of activating the position sensor in response to the detection of the movement signal.

* * * * *